United States Patent [19]
Massa et al.
[11] Patent Number: 4,641,290
[45] Date of Patent: Feb. 3, 1987

[54] LOW FREQUENCY PORTABLE LIGHTWEIGHT SONAR SYSTEMS AND THEIR METHOD OF DEPLOYMENT FOR GREATLY INCREASING THE EFFICIENCY OF SUBMARINE SURVEILLANCE OVER LARGE AREAS

[75] Inventors: Frank Massa, Cohasset, Mass.; Donald P. Massa, 280 Lincoln St., Hingham, Mass. 02043

[73] Assignees: Fred M. Dellorfano, Jr.; Donald P. Massa, both of Cohasset, Mass.

[21] Appl. No.: 670,206

[22] Filed: Nov. 13, 1984

[51] Int. Cl.$^{4}$ ........................... G01S 3/80; H04R 1/02
[52] U.S. Cl. .................................... 367/106; 367/130; 367/153
[58] Field of Search .................... 340/850; 343/5 HE; 367/6, 16, 91, 105, 106, 124, 130, 153, 154, 2, 3, 4, 5, 17, 18, 19, 20, 21, 22; 181/101, 108, 109, 110, 140, 141

[56] References Cited

U.S. PATENT DOCUMENTS

| | | | |
|---|---|---|---|
| 1,293,744 | 5/1917 | Fiske | 367/130 |
| 2,987,029 | 6/1961 | Manuel | 367/130 |
| 3,027,539 | 3/1962 | Stillman, Jr. | 367/130 |
| 3,159,806 | 12/1964 | Piasecki | 367/106 |
| 3,281,767 | 10/1966 | Cryan | 307/16 |
| 3,372,368 | 3/1968 | Dale et al. | 367/3 |
| 3,469,229 | 9/1969 | Pure et al. | 367/106 X |
| 3,526,198 | 9/1970 | Mathes et al. | 367/2 |
| 4,197,591 | 4/1980 | Hagemann | 367/6 |
| 4,198,705 | 4/1980 | Massa | 367/124 X |
| 4,305,140 | 12/1981 | Massa | 367/106 |
| 4,305,141 | 12/1981 | Massa | 367/105 |
| 4,473,896 | 9/1984 | Loeser et al. | 367/4 |
| 4,538,250 | 8/1985 | DeMetz et al. | 367/154 |

*Primary Examiner*—Charles T. Jordan
*Assistant Examiner*—Brian S. Steinberger

[57] ABSTRACT

A novel configuration of a low-frequency lightweight sonar system is described comprising a coaxial assembly of a transmitting transducer and a directional receiving array contained within a cigar-shaped streamlined cylindrical housing less than 1 ft. diameter which operates in the 3 to 4 kHz frequency region and achieves submarine target detection ranges in the order of 20,000 meters with a bearing accuracy within 2°. The small cylindrical streamlined structural assembly results in a very great reduction in drag resistance while it is being towed underwater at high speeds as compared to conventional sonar domes which must be an order of magnitude larger in diameter to accommodate the larger conventional scanning sonar transducers which are several wavelengths in diameter at the operating frequency. The enormous reduction in drag resistance and the novel method of deployment permits the described low-frequency lightweight sonar system assembly to be pulled through the water at very high speeds by small patrol craft or helicopters to achieve very effective long-range low-cost high-speed sonar surveillance of very large areas of the sea.

19 Claims, 3 Drawing Figures

LOW FREQUENCY PORTABLE LIGHTWEIGHT SONAR SYSTEMS AND THEIR METHOD OF DEPLOYMENT FOR GREATLY INCREASING THE EFFICIENCY OF SUBMARINE SURVEILLANCE OVER LARGE AREAS

This invention is concerned with improvements in low-frequency lightweight sonar systems such as those described in U.S. Pat. Nos. 4,198,705; 4,305,140 and 4,305,141. These prior patents were issued to one of the present Applicants and they describe a new sonar system which makes possible the accurate determination of the range and bearing of a submarine target with a very small transducer size which is in the order of 1/50th the size and weight of a conventional scanning sonar transducer operating in the same frequency region. For example, the new sonar system described in U.S. Pat. No. 4,305,140 employing a cylindrical transducer configuration approximately 10 inches diameter by six feet long and weighing approximately 200 lbs. will operate in the 3 to 4 kHz frequency region and detect submarine targets at ranges up to 20,000 meters with a bearing accuracy of approximately 2°.

Since the period of World War II, the difficult problem of effective submarine surveillance has been one of continuing concern and has resulted in the expenditure of billions of dollars without having found a satisfactory cost-effective solution. For the past 40 years, squadrons of sonar patrol Planes have been launching hundreds of thousands of expendable sonobuoys that cost hundreds of millions of dollars. Most of the sonobuoys serve as temporary floating radio transmitters with a very short life span of a few hours or less that transmit audible signals the hydrophones attached to the sonobuoys pick up in the area during the short time that they remain operational.

In order to improve the efficiency and speed of carrying on effective submarine surveillance over large areas of ocean or coastal waters and also to reduce the tremendous cost associated with the continuing use of many millions of dollars worth of expendable sonobuoys, there has been intermittent and recurring interest over the past several decades in the development of helicopter-mounted dipping sonar systems. In order to reduce the size of the conventional sonar transducer to make it compatible for helicopter installation, the conventional sonar had to be designed for high frequency operation (generally in the 10 kHz region) which resulted in serious deficiencies in locating targets at ranges beyond a few thousand yards.

The present invention overcomes the basic problem which has long been associated with conventional scanning sonar systems; namely, the requirement for the use of large transducer arrays which must be several wavelengths in diameter in order to form the directional beams needed for operating the sonar. It is this basic requirement that has been primarily responsible for the unsatisfactory results that have been generally experienced with various designs of sonar systems for use in helicopter-mounted dipping sonars.

Another continuing attempt to improve the efficiency and speed of conducting submarine surveillance over large areas has been the development of variable depth sonar (VDS). The VDS sonar transfers the position of the conventional scanning sonar transducer from the ship's bottom to a separate streamlined sonar dome which is towed by the ship at the end of a long cable.

The sonar frequency for VDS operation also had to be increased to the 10 kHz region in order to keep the size of the towed VDS sonar transducer within manageable weight limits. The conventional VDS transducer and its streamlined sonar dome is expensive and heavy and requires the installation of massive steel structural equipment on the ship for use in towing, retrieving and storing the heavy VDS unit.

The present invention overcomes the weight and high frequency limitations that have prevented the general use of conventional scanning sonar systems for dipping and VDS applications to achieve efficient high speed surveillance of large areas of the sea.

The primary object of this invention is to provide a novel configuration of a low-cost lightweight portable low frequency sonar system that can be readily deployed from a small high speed patrol craft or from a helicopter to permit very efficient low cost surveillance of very large coastal areas.

Another object of this invention is to very greatly reduce the underwater towed resistance presented by the proposed sonar transducer configuration by more than an order of magnitude over the water resistance encountered by streamlined domes which enclose conventional scanning sonar transducers, and thereby make possible the efficient high speed towing of the proposed new transducer configuration by small high speed patrol craft.

A further object of this invention is to provide a greatly improved method of high speed towing and deployment of a novel configuration of a new lightweight high-power sonar system which will give high resolution of range and bearing for submarine targets at distances in the order of 20,000 meters or more.

Still another object of this invention is to very substantially reduce the enormous cost associated with the continuing widespread use of hundreds of thousands of expendable sonobuoys which are presently being consumed during submarine surveillance patrols and at the same time considerably increase the submarine surveillance capability by the use of the inventive sonar system.

These and other objects of the invention will become evident in the following detailed description of a preferred embodiment. The novel features which are characteristic of the invention are set forth with particularity in the appended claims. The invention itself, however, both as to its organization and method of operation, as well as advantages thereof, will best be understood from the following description of several embodiments thereof when read in connection with the accompanying drawings, in which:

Figure 1:
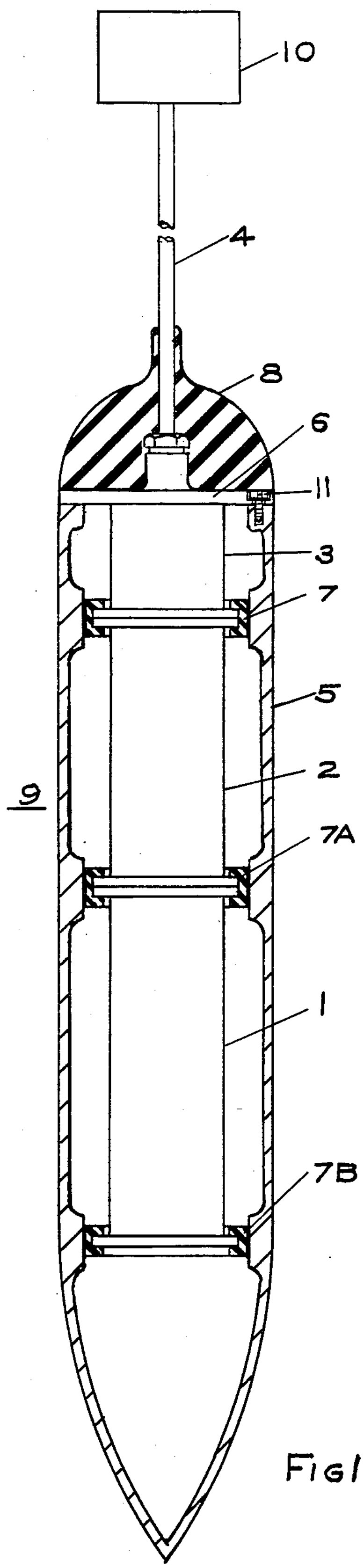
FIG. 1 is a schematic illustration of a novel configuration of a new lightweight portable low frequency sonar system that permits high speed towing and deployment of the sonar system to achieve efficient high speed submarine surveillance of large areas of the sea in accordance with the teachings of this invention.

Referring more particularly to the figures, FIG. 1 is a partial cutaway schematic view illustrating the major components of the new sonar system arranged in a configuration to achieve the objects of this invention. The cylindrical structure 1 represents the receiving hydrophone array which, for example, could be an array of three identical directional hydrophones each having a cardioid directional pattern in the horizontal plane at right angles to the common vertical axis of the array assembly and arranged in a symmetrical horizontal configuration with each receiving hydrophone element assembly having its principle axis of maximum sensitivity oriented 120° in the horizontal plane from the corresponding principle axes of its neighbors. By comparing the relative magnitudes of the voltages generated in each of the three cardioid hydrophones upon receiving the sonar echo from the submarine target the precise bearing of the target is automatically determined. Complete details of the operation and construction of the small tri-cardioid receiving hydrophone array is described in U.S. Pat. No. 4,198,705.

The use of the tri-cardioid hydrophone receiving array overcomes the prior art need for electronically scanning a conventional large size scanning sonar transducer array as is required in the operation of the conventional prior art scanning sonar systems. The axial length of the directional hydrophone array 1 is preferably made a multiple of the wavelength of sound at the frequency of operation in order to produce a null in the beam pattern along the longitudinal axis of the array to advantageously discriminate against the pickup of surface noises when the assembly is deployed for use in accordance with the teachings of this invention.

Figure 2:
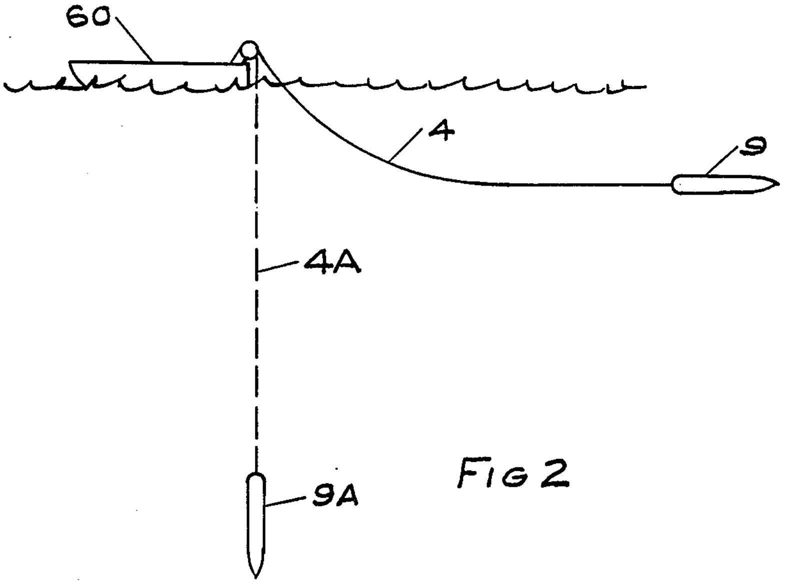
FIG. 2 is a schematic illustration of the deployment of the improved portable sonar system from a small high speed patrol craft to achieve improved high speed submarine surveillance of large areas of the sea.

Mounted coaxially with the receiving hydrophone array is a high-power low-frequency transducer 2 which generates an omnidirectional beam of sound in a plane at right angles to the longitudinal axis of the assembly when supplied with a tone burst audio signal. A suitable design of a lightweight high-power transducer that could be used effectively in this proposed novel towed sonar configuration is described in U.S. Pat. No. 4,305,140. An example of a specific transducer design is illustrated in FIG. 2 of U.S. Pat. No. 4,305,140 which shows a cylindrical structure approximately $\frac{1}{2}$ wavelength diameter $\times 27''$ long that delivers 6 kW of acoustic power in an omnidirectional horizontal beam when driven by a 10 kW electrical tone burst in the $3\frac{1}{2}$ kHz region. The total weight of the described transducer is approximately 60 lbs. If the length of the transducer assembly is doubled, its weight will increase to approximately 100 lbs. and the power handling capacity will be increased to 20 kW at approximately 60% efficiency.

The waterproof housing 3 encloses some of the electronic circuits necessary for operating the system. The power supply and display electronics are contained within the schematic block 10 which is shown attached to the on-board end of the cable 4. Details of the electronics and wiring connections are not shown as they are not part of this invention. The invention resides in the novel configuration of the lightweight sonar system and in the method of its deployment from a high-speed patrol craft or helicopter to achieve the objects of this invention as will be described later. The tow cable 4 which is shown sealed and attached to the top plate 6 of the housing 3 includes the electrical conductors for operating the sonar system.

A lightweight streamlined sound-transparent cylindrical housing 5 preferably made of fiberglass or any other underwater sound-transparent structural material, as is conventionally employed in the manufacture of sonar domes, surrounds the axial assembly of the sonar system elements. The streamlined housing 5 is a cigar-shaped cylindrical structure having a smaller diameter than one wavelength at the operating frequency of the sonar system, and preferably the diameter is in the vicinity of $\frac{1}{2}$ wavelength. This structure presents a very great reduction in drag resistance while being towed underwater at high speeds as compared to conventional towed sonar domes which must be an order of magnitude larger in diameter in order to accommodate the conventional scanning sonar transducers which must be several wavelengths in diameter as is well known in the art. Thus, because of an order of magnitude reduction in the diameter of Applicants' streamlined housing, the reduction in drag resistance during tow will be approximately two orders of magnitude below that of a conventional towed scanning sonar system operating at the same frequency. With this enormous reduction in drag resistance, the disclosed sonar system can be pulled through the water at very high speeds by a small high-speed patrol craft 60 or helicopter 70 as illustrated by the solid lines in FIG. 2 and FIG. 3.

The streamlined housing 5 shown in FIG. 1 has an opening at the top end so that the axial assembly of the structures 1, 2 and 3 can be installed through the open end. The uppermost flange plate 6 of the cylindrical housing structure 3, which is preferably of larger diameter than the diameters of the flange ends of structures 1 and 2, is then fastened at its periphery to the open end of the streamlined sonar housing 5 using the bolts 11. The rubber grommets 7, 7A and 7B which are shown in place over the peripheries of the flanged ends of the housing structure 1, 2 and 3 serve the dual purpose of centering the axis of the transducer assembly with the axis of the sonar housing 5 and also acting as shock mounts between the transducer assembly and the streamlined outer housing 5.

A streamlined nose section 8, is preferably fabricated of a rubber-like material to serve as a strain relief for the cable 4 which passes through a hole in the center of the nose section 8 as shown in FIG. 1. The flat base portion of the nose section 8 may be cemented or otherwise attached to the top flat surface of the flange plate 6 to complete the assembly of the lightweight portable sonar system 9. The free end of the cable 4 is connected to the power supply and the display console 10 on board the towing vehicle to complete the operational installation of the lightweight streamlined sonar system. The details of the power supply and display console are not shown because it is not relevent to this invention which is primarily concerned with a novel configuration of a low-frequency lightweight sonar system and an improved method of its deployment to achieve low-cost high-speed submarine surveillance of large coastal areas as herein disclosed.

FIG. 2 illustrates one proposed method of deploying the herein described small diameter streamlined sonar transducer assembly from a small high-speed patrol craft for accomplishing the high-speed sonar surveillance of very large areas of the sea. If the patrol craft 60 is stationary, the streamlined sonar assembly will be in the dotted position 9A suspended vertically at the end of the cable 4A. In the dotted position shown, the sonar transducer assembly 9A is ready to search for submarine targets by sending out tone burst pulses of sound from the transmitting transducer 2 which will be radiated omnidirectionally in the horizontal plane at right angles to the vertical axis of the transducer assembly 9A. The length of cable which is released from the patrol craft may be determined from the prevailing bathythermographic data at the vessel's position as is well known to a sonar operator skilled in the art. While operating the sonar transducer in the dotted position in FIG. 2, the sonar detection range will be very high because of the minimum water noise that results from the stationary suspended transducer.

At a submarine target range of 20,000 meters, which can be easily achieved by the described low-frequency sonar system, the roundtrip transmission time for the sonar pulse to return from the target will be approximately 27 seconds which means that during a period of 5 minutes, 10 sonar surveillance measurements can be made. At the end of 5 minutes the patrol craft can be operated at full throttle to move at full speed for a distance of 20 km. During the high-speed towing period, the vertical sonar assembly 9A will move to the approximately horizontal position 9 as indicated by the solid line sketch in FIG. 2. Because the sonar assembly 9A is very small in diameter (less than one wavelength) and because it is hydrodynamically streamlined, it will impose an extremely low drag resistance while being towed. Therefore, the small patrol craft 60 will be able to operate at top speed without being slowed down significantly because of the very low drag resistance of the inventive small diameter streamlined sonar assembly 9.

If the patrol craft 60 is moving at 30 knots, for example, it will take approximately 21 minutes to travel 20 km, at which time the patrol craft can be brought to a stop and the sonar surveillance observation can be repeated. While travelling at high speed, the streamlined sonar assembly 9 will be towed in the horizontal position as shown by the solid line in FIG. 2. While being towed the sonar system will not be operating. However, when the high-speed patrol craft 60 reaches its next destination, for example 20 km from the previous sonar surveillance station, and stops its forward motion, the streamlined sonar assembly 9 will drop to the dotted position 9A where it is ready to resume its submarine surveillance operation. After 5 minutes of sonar search, the patrol craft will again move at high speed for another 20 km to the next surveillance position. At the assumed patrol craft speed of 30 knots and with an assumed 5 minutes of echo ranging measurements taken at each stop, the surveillance area that will be covered during each hour of operation will be approximately 40 km wide by 46 km long. By stopping at each successive 20 km distance as indicated in the example, there will be a 50% overlap of the surveillance data being taken over the patrolled area.

For the above assumed condition of operation, the area of surveillance covered by one small patrol craft will be approximately 650 sq. miles per hour with a 50% overlap surveillance data coverage of the area. Thus, by operating one small high-speed patrol craft for a 24-hour period, the total area of sonar surveillance coverage by the disclosed sonar system will be approximately 16,000 square miles. This means that the entire 10,000 mile coastline of the United States could be kept under continuous 24-hour surveillance over a 24-mile wide strip of water with only 15 high-speed patrol craft operating continuously in the water. To continuously search the entire U.S. coastline over a 100-mile wide strip of water would require a total of only 60 small patrol craft in the water. This enormous rate of surveillance coverage would be achieved with a low-cost lightweight low-frequency sonar as disclosed herein that can be easily towed from a small low-cost high-speed patrol craft as described and with a savings of hundreds of millions of dollars as compared with the use of expendable sonobuoys that have only a limited use for a very short period of time. Additionally, the new proposed sonar system will be very much more effective at long range detection of quiet submarine targets that are running at low speed and at low levels of radiated noise as compared to the conventional sonobuoys whose range is drastically reduced when the submarine radiated noise is reduced.

Figure 3:
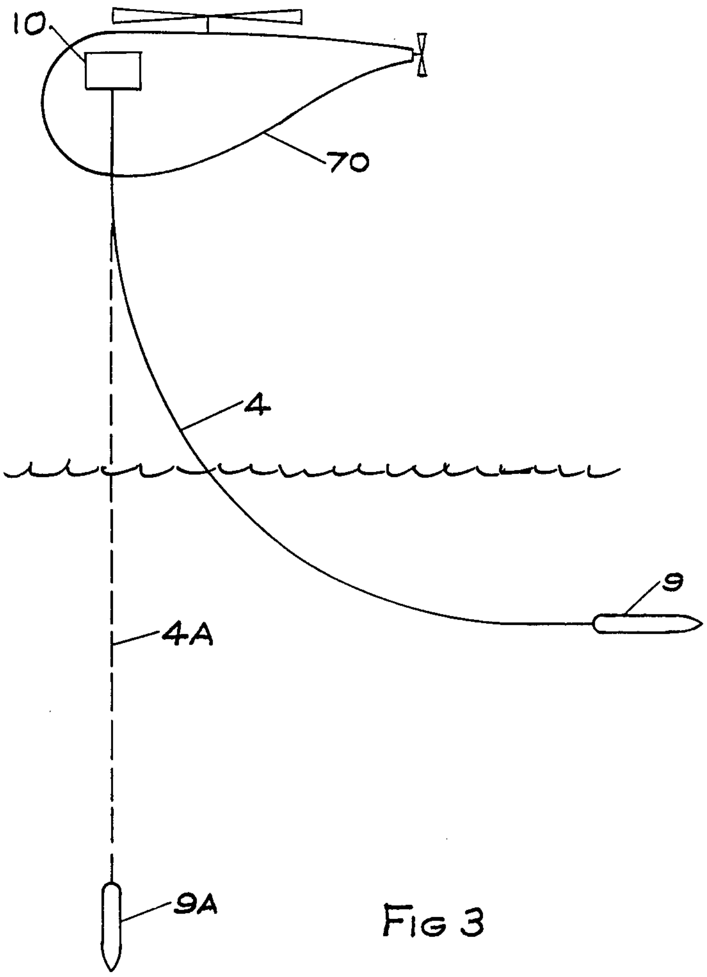
FIG. 3 is another schematic illustration of the deployment of the improved portable sonar system from a helicopter to achieve greatly improved high speed submarine surveillance of large areas of the sea.

FIG. 3 illustrates another use of the same sonar surveillance system as described in connection with FIG. 2, except that the transducer is suspended from a helicopter 70. When the helicopter hovers, the streamlined transducer assembly will drop to the dotted vertical position 9A as illustrated in FIG. 3. In this position, the sonar is ready for operation in the same manner as described for the dotted position of FIG. 2. After completing 5 minutes of sonar surveillance measurements, the helicopter simply moves forward at high speed a distance of 20 km, for example, while the streamlined assembly 9 is being towed in a horizontal position as illustrated by the solid line sketch in FIG. 3. Preferably the helicopter can rise in altitude sufficient to lift the transducer out of the water and then proceed at an even greater speed to the next surveillance point with even greater reduced drag resistance on the transducer by towing it through the air.

If desired, the sonar transducer assembly 9 can be pulled up completely into the helicopter instead of being towed through the air or through the water. However, because of the very low drag force on the streamlined body, which is less than 1 ft. diameter for a low-frequency sonar operation in the 3 to 4 kHz region, there will be practically effortless high-speed towing of the described sonar by the helicopter, whether through the water or through the air, there is no necessity of retrieving the tow cable and the attached transducer assembly into the helicopter after stopping at each successive 20 km position to make continuing sonar surveillance measurements. A final decision among the alternate choices of deployment of the lightweight low-frequency sonar system would be based on which choice results in minimum total elapsed time for moving the inventive streamlined sonar transducer assembly from point to point during the sonar surveillance operation.

If designed for operation in the mid-audible frequency region in the approximate vicinity of $2\frac{1}{2}$ to 5 kHz, the sonar transducer assembly illustrated in FIG. 1 and described in detail in U.S. Pat. No. 4,305,140 will weigh approximately 200 lbs. The complete sonar transducer system can be contained within a streamlined cylindrical housing approximately 1 ft. diameter or less, which will result in very greatly reduced drag resistance while being towed at high speeds as compared to conventional VDS towed sonars. In order to keep the towed weight of a conventional VDS sonar to manageable levels, the VDS sonar is designed to operate in the less desireable high frequency region of 10 kHz or higher, which greatly reduces the sonar detection range because of the greater attenuation of the higher frequencies through the water. Because the conventional scanning sonar transducers must be several wavelengths in diameter, as is well known in the art, it is necessary that even the less effective high frequency scanning sonar transducers must be several feet in diameter and weigh several thousand pounds. Structures of this size cannot be towed efficiently by small patrol craft at high speeds. By contrast, the new sonar system described herein is only about ½ wavelength in diameter and weighs approximately 200 lbs. A conventional scanning sonar transducer designed to operate in the same 3.5 kHz region would be approximately 14 feet in diameter and weigh about 20,000 lbs. Thus, by the reduction in diameter of the towed cylindrical streamlined housing used with the disclosed low-frequency sonar surveillance system by an order of magnitude over the conventional VDS sonar system employing a conventional scanning sonar transducer, the drag resistance of the disclosed sonar surveillance system while being towed will be reduced by about two orders of magnitude over the conventional VDS scanning sonar system.

Although a few specific embodiments of the present invention have been shown and described, it should be understood that various additional modifications and alternative constructions may be made without departing from the true spirit and scope of the invention. Therefore, the appended claims are intended to cover all such equivalent alternative constructions that fall within their true spirit and scope.

We claim:

1. In combination in a lightweight long-range sonar submarine surveillance system, an underwater transmitting transducer comprising a line array of electroacoustic transducer elements, mounting means for holding said transducer elements in specified vertically spaced positions along a common vertical axis, said line array of transducer elements characterized in that the transducer assembly is contained within a cylindrical envelope less than one wavelength in diameter at the frequency of operation of the transducer, and further characterized in that the transducer operates at an audible frequency that lies below 10 kHz, an underwater receiving hydrophone array comprising a plurality of directional hydrophone element assemblies, mounting means for holding said hydrophone element assemblies in a fixed configuration about said common vertical axis such that each hydrophone element assembly within the array is held at a fixed orientation in the horizontal plane, said fixed orientation characterized in that the principle axis of maximum sensitivity of one of said plurality of said directional hydrophone element assemblies is located midway between the principle axes of two adjacent hydrophone element assemblies in the array, an acoustically transparent streamlined cylindrical housing surrounding said axial assembly of said line array of transmitting transducer elements and said receiving hydrophone array of directional hydrophone element assemblies in axial alignment within said cylindrical streamlined housing structure, and a tow cable attached to said streamlined assembly.

2. The invention in claim 1 characterized in that said operating audible frequency lies within the approximate frequency range 2½ to 5 kHz.

3. The invention in claim 1 characterized in that said plurality of directional hydrophone element assemblies comprises 3 identical assemblies, each having a directional pattern which is approximately a cardioid in the horizontal plane within the region of $\pm 120°$ from its principle axis of maximum sensitivity and further characterized in that the principle axis of each of said 3 identical hydrophone assemblies is displaced in azimuth by 120° from the principle axes of its neighboring hydrophone assemblies.

4. The invention in claim 3 further characterized in that said operating audible frequency lies within the approximate frequency range 2½ to 5 kHz.

5. The invention in claim 4 further characterized in that the diameter of said streamlined cylindrical housing structure is approximately 1 ft. or less.

6. The invention in claim 3 and an over-water vehicle, means for suspending said streamlined cylindrical housing by its tow cable from said overwater vehicle, said suspension means characterized in that said streamlined housing can be held submerged at a specified depth with the axis of said streamlined housing remaining in an approximately vertical position when said vehicle is at rest, said suspension means further characterized in that if said vehicle is set in motion at high speed in excess of approximately 15 knots while said streamlined housing is submerged said cylindrical streamlined housing will be towed by said cable and the axis of said streamlined cylindrical housing while under high speed tow assumes an approximate horizontal position whereby a low drag resistance is presented by the streamlined cylindrical housing during high speed tow.

7. The invention in claim 6 further characterized in that the diameter of said streamlined cylindrical housing is approximately 1 ft. or less and still further characterized in that said operating frequency lies within the approximate range 3 kHz to 4 kHz.

8. The invention in claim 7 further characterized in that said overwater vehicle is a high-speed patrol craft.

9. The invention in claim 7 further characterized in that said overwater vehicle is a helicopter.

10. The invention in claim 1 and an over-water vehicle, means for suspending said streamlined cylindrical housing by its tow cable from said overwater vehicle, said suspension means characterized in that said streamlined housing can be held submerged at a specified depth with the axis of said streamlined housing remaining in an approximately vertical position when said vehicle is at rest, said suspension means further characterized in that if said vehicle is set in motion at high speed in excess of approximately 15 knots while said streamlined housing is submerged said cylindrical streamlined housing will be towed by said cable and the axis of said streamlined cylindrical housing while under high-speed tow assumes an approximate horizontal position whereby a low drag resistance is presented by the streamlined cylindrical housing during high-speed tow.

11. The invention in claim 10 further characterized in that the diameter of said streamlined cylindrical housing is approximately 1 ft. or less and still further characterized in that said operating frequency lies within the approximate range 3 kHz to 4 kHz.

12. The invention in claim 11 further characterized in that said overwater vehicle is a high-speed patrol craft.

13. The invention in claim 11 further characterized in that said overwater vehicle is a helicopter.

14. An improved method for achieving high-speed high-efficiency long-range towed sonar surveillance over very large areas including the following steps:

1. Attach by tow cable to a high-speed over-water vehicle an audio frequency towable sonar system capable of operating at a frequency within the approximate range 2 kHz to 5 kHz and contained within a small cylindrical streamlined housing less than one wavelength in diameter at the frequency of operation and capable of detecting the range and bearing of submarine targets within a radius in excess of 10,000 meters in a plane at right angles to the longitudinal axis of the cylindrical structure;

2. With the over-water vehicle at rest or drifting slowly and the longitudinal axis of the towed cylindrical sonary housing held approximately vertical in the water, making several sonar searches over a period of a few minutes to determine the presence of any submarine targets within the radius of detection of the sonar system;
3. Apply power to the over-water vehicle and with the sonar still in tow proceed at high speed to a distant point removed approximately by 50% to 100% of the maximum range of detection of the sonar system from the last sonar search point;
4. Cut power to the over-water vehicle and when the speed has decreased sufficiently so that the longitudinal axis of the cylindrical sonar housing is approximately vertical in the water repeat making several sonar searches over a period of a few minutes and then proceed again at high speed to the next distant point of surveillance.

15. The improved method of sonar surveillance in claim 14 characterized in that the diameter of said cylindrical streamlined housing is approximately ½ wavelength at the operating sonar frequency.

16. The improved method of sonar surveillance in claim 15 further characterized in that said over-water vehicle is a surface vessel.

17. The improved method of sonar surveillance in claim 15 further characterized in that said over-water vehicle is an aircraft.

18. The improved method of sonar surveillance in claim 14 characterized in that said over-water vehicle is a surface vessel.

19. The improved method of sonar surveillance in claim 14 characterized in that said over-water vehicle is an aircraft.

* * * * *

UNITED STATES PATENT AND TRADEMARK OFFICE

CERTIFICATE OF CORRECTION

PATENT NO. : 4,641,290

DATED : February 3, 1987

INVENTOR(S) : Frank Massa et al.

It is certified that error appears in the above-identified patent and that said Letters Patent is hereby corrected as shown below:

On the Title Page, Item [73] Assignees: should be deleted to appear as shown below:

-- Fred M. Dellorfano, Jr. and Donald P. Massa, Trustees of The Stoneleigh Trust u/d/t, Cohasset, Mass. --

Signed and Sealed this

Twenty-first Day of April, 1987

*Attest:*

DONALD J. QUIGG

*Attesting Officer*

*Commissioner of Patents and Trademarks*